UNITED STATES PATENT OFFICE.

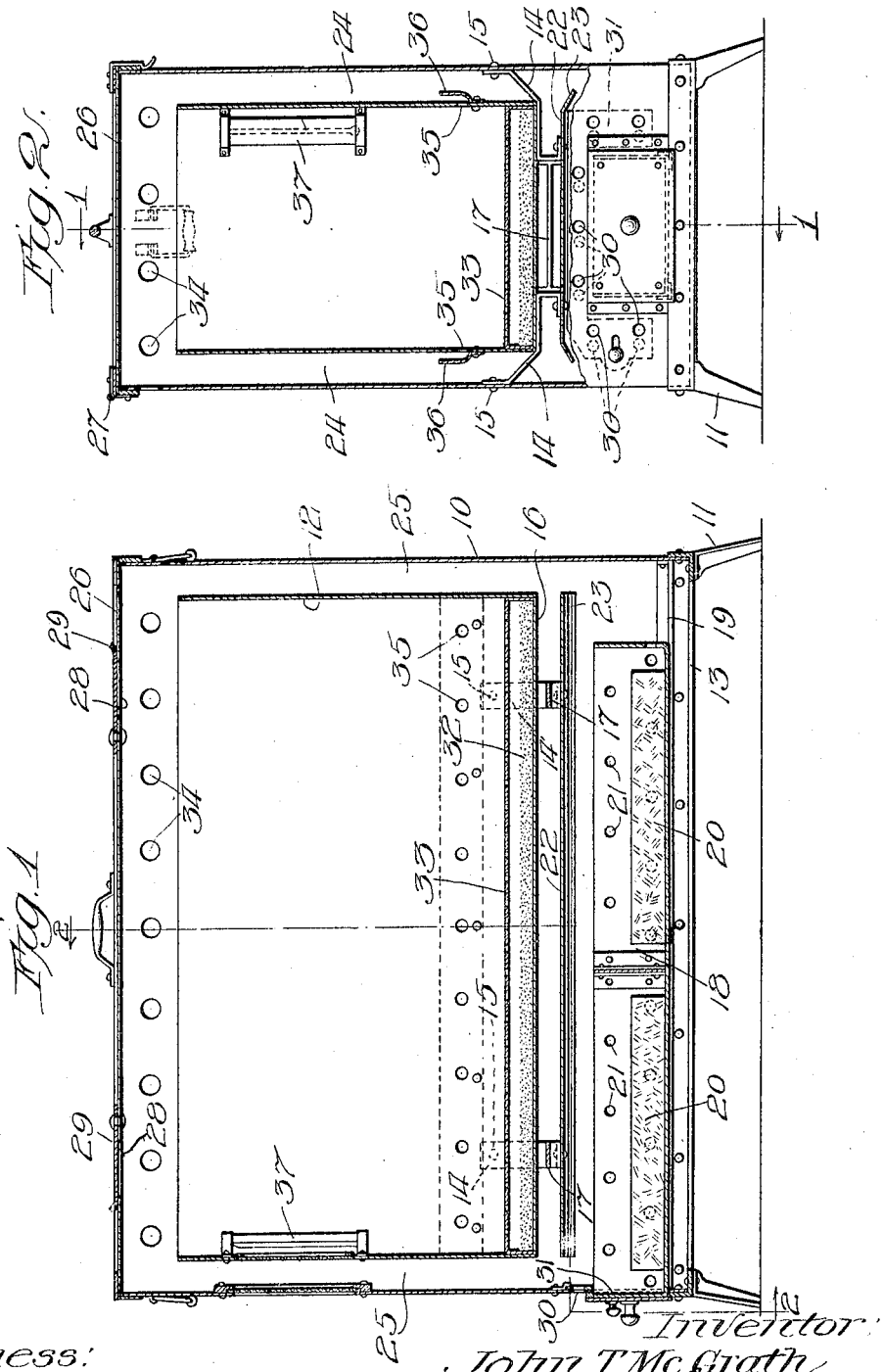

JOHN T. McGRATH, OF BLOOMINGTON, ILLINOIS.

PIG-BROODER.

1,317,516. Specification of Letters Patent. Patented Sept. 30, 1919.

Application filed January 12, 1918. Serial No. 211,548.

*To all whom it may concern:*

Be it known that I, JOHN T. McGRATH, a citizen of the United States, and a resident of Bloomington, in the county of McLean and State of Illinois, have invented certain new and useful Improvements in Pig-Brooders; and I do hereby declare that the following is a full, clear, and exact description thereof, reference being had to the accompanying drawings, and to the characters of reference marked thereon, which form a part of this specification.

This invention relates to a novel pig brooder, the purpose of which is to give young pigs a warm compartment of suitable humidity for a period necessary to develop strength for natural feeding.

The purpose of the invention is to produce a very simple and economical device of this character which is equipped with means for producing and maintaining within an inclosure an atmosphere of predetermined temperature and humidity, and to provide heating means so constructed as to avoid danger of burning the pigs placed in the brooder.

The invention relates further to certain details of construction in devices of this character designed to facilitate the assemblage of the device and to render easy access thereto to place the pigs in and to remove them from the brooder, and also designed to control the passage of the air through the brooder to facilitate the maintenance of proper temperature.

The invention consists in the combination and arrangement of the parts shown in the drawings and described in the specification, and is pointed out in the appended claims.

In the drawings,

Figure 1 is a vertical longitudinal section of a brooder, taken on the line 1—1 of Fig. 2.

Fig. 2 is a transverse vertical section thereof on the line 2—2 of Fig. 1.

The principal parts of the brooder are made of sheet metal, galvanized iron being recommended. It comprises an outer box or casing 10 supported a distance from the floor by legs 11, and an inner brooder box or chamber 12 supported in the box 10 in any suitable manner above the bottom wall 13 of the outer box, and spaced from the side and end walls of said box to produce defined air passages or flues.

As herein shown, said brooder chamber is closed at its bottom and sides and open at its top. It is supported, as herein shown, on the side walls of the outer box 10 by suitable hangers or saddles consisting of bracket members 14, 14 which are attached, as by rivets 15, to the side walls of the outer box and extend inwardly beneath the bottom wall 16 of the brooder chamber. The said brackets are turned downwardly and outwardly at their inner ends and are joined by a flanged connecting bar 17, as best shown in Fig. 2, to complete the saddle structure. Two of these saddles or hangers are employed, one at each end of the device. Below said hangers is located a sliding drawer 18 which is disposed longitudinally of the outer box and is adapted to slide toward the front of the box through an opening in the front wall of the latter. Said drawer is supported and slides on angle bars 19 fixed to the side walls of the box 10. The purpose of the drawer is to contain and support heater elements 20, which, in the present instance, have the form of bricks, and are made of any suitable composition to retain applied heat over a considerable period of time; said bricks being made of a substance to slowly give off heat. The drawer is open at its top and the side and end walls thereof are provided with distributing openings 21 to permit the heated air to be distributed laterally from the drawer as well as through the open top. A deflector plate 22 is arranged immediately above the drawer and extends laterally beyond the same at each side, as herein shown at 23, which prevents the heated air from directly striking the bottom wall of the brooder chamber; it being necessary to keep said wall cool to prevent scorching the pigs placed in the chamber. Said deflector plate is shown as fixed to and supported on the carriers or saddles for the brooder chamber, and the lateral, longitudinal edges of the plate are deflected downwardly at 23 to better distribute the air passing upwardly from the heating drawer.

The spacing of the brooder chamber 12 from the side and end walls of the outer box 10 provides at the sides of the brooder chamber vertical air passages or flues 24 and at the ends thereof other vertical air passages or flues 25 through which the heated air ascends to heat the brooder chamber. The outer box is provided with a top wall or cover 26, preferably hinged at one edge at 27 so as to swing upwardly away from the open top of the box. Said swinging cover is provided with one or more cold air inlet openings 28, two being herein shown, which are controlled by dampers 29 of any suitable form. Through these inlet openings cold air passes into the casing for entrance to the open top of the brooder chamber 12, the dampers providing means for variably controlling the entrance of cool air to the brooder. Air is controllably admitted to the lower or bottom portion of the outer box 10 near the lower ends of the flues through apertures 30, herein shown as formed in the front end wall of the box, and these apertures are controlled by a sliding apertured damper 31. Heated air which rises through the flues 24, 25 escapes partially from the box through vent openings 34 in the side and end walls of the top of the box above the brooder chamber, and a portion thereof is diverted to the brooder chamber to pass downwardly therein.

The controllable air supply furnished by the operation of the damper 31 and the damper 29 enables the volume of air which is passed through the device to be varied and its temperature controlled to correspond to given requirements.

A suitable humidifier is located at the bottom of the brooder chamber to regulate the moisture of the heated air. A convenient way of producing this humidifier is to place a layer of sand or like granular material 32 on the bottom wall or floor 16 of the brooder chamber, and arranged above said humidifier medium is a false bottom 33 or floor for the brooder chamber on which the pigs are directly supported, this false bottom being apertured to allow moisture to pass upwardly from the humidifier chamber into the brooder chamber.

In order to force air through the brooder chamber, the side walls of the brooder chamber are provided, near the false bottom 33, with a series of vent openings 35, and arranged just outside of these vent openings and supported on the side walls of the brooder chamber are longitudinally disposed deflector plates 36 which are fixed at their lower margins, below the vent openings 35, to said walls, and extend at their upper edges above said vent openings, the said upper edges being spaced laterally from said side walls. As a result of the arrangement and disposition of the inlet openings 28 and vent openings 35 with their deflecting plates, the hot air columns ascending through the flues 24 and passing the deflector plates, draw downwardly through the open top of the brooder chamber by an aspirating effect a certain amount of fresh air, together with a portion of the heated air which rise through the flues 24 and 25, into the brooder chamber, and discharge said air outwardly through the vent openings 34, thereby tempering the air admitted to said chamber. If the inlet openings 28 be closed a portion of the heated air alone may be thus circulated through the brooder chamber.

A thermometer 37 is supported within the brooder chamber, on one end wall, as herein shown, and said wall is, as well as the portion of the adjacent end wall of the outer box abreast the thermometer, provided with transparent windows through which the thermometer may be read.

In the operation of the device, the heat retaining bricks 20 are heated to the proper temperature and placed within the drawer 18. The humidifier medium 32 having theretofore been placed on the bottom 16 of the brooder chamber is dampened. The dampers 29 are thereafter adjusted. After the brooder chamber has been heated to the required temperature by the heat given off by the bricks 20 the pigs are placed in the brooder chamber through the open top thereof and are allowed to remain therein for the required length of time, and during the period which the pigs occupy the brooder chamber the volume of air and temperature thereof is regulated by the proper manipulation of the dampers 31 and 29.

It will be understood that minor changes may be made in the details of construction without departing from the spirit of the invention, and while heat retaining heater elements are herein disclosed other heating means may be employed. Furthermore, other forms of humidifier may be adapted to the brooder chamber.

What I claim as my invention is:

1. A brooder device comprising an outer box having a movable top, a brooder chamber supported therein and separated from the box walls by vertical air flues and provided with a perforated supporting floor, heating means within the box below said floor, deflector means between the heater means and said floor, and humidifier means within said chamber below said perforated floor.

2. A brooder device comprising an outer box having a movable top and provided near its bottom with cold air inlet openings and near its top with hot air vent openings, an open top brooder chamber supported therein and separated from the box walls by vertical air flues and provided with a perforated floor, heater means within the box below said chamber and near said cold air inlet openings, and humidifier means within said chamber and below said floor.

3. A brooder device comprising an outer box having a movable top and provided near its bottom with cold air inlet openings and near its top with hot air vent openings, an open top brooder chamber supported therein and separated from the box walls by vertical air flues and provided with a perforated floor, heater means within the box below said chamber and near said cold air inlet openings, deflector means between the heater means and said floor of the chamber, and humidifier means within said chamber and between said deflector means and said floor.

4. A brooder device comprising a box having a movable top, an open top brooder chamber supported therein and separated from the box wall by vertical flues for ascending columns of hot air, heater means within the box below said chamber, cold air inlet and hot air vent openings for said box, respectively at the bottom and top thereof, humidifier means for said chamber, and aspirating means at the lower ends of said flues to effect a downward flow of tempered air through said brooder chamber.

5. A brooder device comprising a box having a movable top, an open top brooder chamber supported therein and separated from the box wall by vertical flues for ascending columns of hot air, heater means within the box below said chamber, cold air inlet and hot air vent openings for said box, respectively at the bottom and top thereof, and aspirating means at the bottom of said flues controlled by ascending columns of hot air through the flues to effect downward flow of air through said chamber.

6. A brooder device comprising an outer box, a brooder chamber therein and separated from the box walls by vertical flues, heater means within the box below said chamber, there being means for admitting cold air to the box above said chamber, and aspirating means near the bottom of the chamber and controlled by ascending heated air columns passing through said flues for effecting circulation of tempered air downwardly through said chamber.

7. A brooder device comprising an outer box, an open top brooder chamber therein, separated from the box walls by vertical flues, heater means within the box below said flues, deflector means between the heater chamber and the bottom of said chamber, humidifier means within the box for the said chamber, there being means for admitting cold air to the box above said chamber and aspirating means near the bottom of the chamber and controlled by ascending heated air columns through said flues for effecting circulation of tempered air downwardly through said chamber.

8. A brooder device comprising an outer box having a movable top, an open top brooder chamber supported therein and separated from the box walls by spaces constituting vertical flues and provided with a perforated floor, heater means within said box below said floor, humidifier means within the chamber and below said floor, there being means for admitting cold air to the box above said chamber, and aspirating means near the bottom of the chamber and controlled by ascending air columns through said flues for effecting circulation of tempered cool air downwardly through said chamber.

9. A brooder device comprising an outer box having a movable top, an open top brooder chamber therein and separated from the box walls by spaces constituting vertical flues, with heater means at the lower ends thereof and provided with a perforated floor, humidifier means within the chamber below said floor, means to regulably admit air to the box at the lower ends of said flues and near the heater means, and aspirator means controlled by the ascending heated columns of air through said flues for effecting the circulation of tempered air downwardly through said chamber.

10. A brooder device comprising an outer box, a brooder chamber therein provided with a perforated floor and separated from the box walls by spaces constituting vertical flues, humidifier means within the chamber and below said floor, said box being provided near its top with hot air vent openings and provided near the bottoms of the flues with cold air inlet openings, with means for regulating the flow of air therethrough, and the box being provided above said chamber with cold air inlet openings, with means to regulate the flow of air therethrough, and means near the bottom of the chamber and controlled by ascending hot air columns through said flues for effecting downward circulation of air through said chamber.

11. A brooder device comprising an outer box, means for supporting a heater element at the bottom of the box, a brooder chamber supported within the box above the heater element and spaced from the box walls to produce vertical flues, a deflector between the heater element support and the bottom of the box, a humidifier for said chamber, the box being provided above the level of the open top of the chamber with a vent opening and the side walls of the chamber being provided near the bottom thereof with vent openings, and deflector plates in the flues coöperating with the latter vent openings.

12. A brooder device comprising an outer box, means for supporting a heater element at the bottom of the box, an open top brooder chamber supported within the box above the heater element and spaced from the box walls to produce vertical flues, the box being provided above the level of the open top of the chamber with a cold air inlet opening and with hot air vent openings, and the side walls of the chamber being provided near the bottom thereof with vent openings, and deflector plates in the air flues coöperating with the latter vent openings.

13. A brooder device comprising an outer box having a movable top, an open top brooder chamber supported therein and spaced from the box walls by vertical air flues, heater means within the box below said chamber, deflector means between the heater means and the bottom of said chamber, the said support for the brooder chamber comprising saddles extending across said box and attached to the side walls thereof and the deflector means being supported by said saddle.

14. A brooder device comprising a box, an open top brooder chamber therein and spaced from the box walls by hot air flues having vent openings at their tops, and in communication with the brooder chamber through the open top thereof, heater means in the box below said chamber, said chamber being provided near its bottom with vent openings constructed with means, under the influence of the rising columns of hot air in said flues, to effect downward circulation of air inwardly through said vent openings and downwardly into said brooder chamber.

15. A brooder device comprising a box, an open top brooder chamber therein and spaced from the box walls by hot air flues having vent openings at their tops, and in communication with the brooder chamber through the open top thereof, heater means in the box below said chamber, the box being provided with inlets at its top and bottom to admit cold air, and the chamber being provided near its bottom with vent openings constructed with means, under the influence of the rising columns of hot air in said flues, to effect downward circulation of commingled cool and hot air through said brooder chamber.

In witness whereof I claim the foregoing as my invention, I hereunto append my signature in the presence of two witnesses at Bloomington, Illinois, this 15th day of December, 1917.

JOHN T. McGRATH.

Witnesses:
 MAE CLEARY,
 KATHARINE WHITAKER.

Copies of this patent may be obtained for five cents each, by addressing the "Commissioner of Patents, Washington, D. C."